Oct. 27, 1931.  C. F. GODDARD  1,829,591
ROAD FILE
Filed March 25, 1930   3 Sheets-Sheet 1

Inventor
CHARLES F. GODDARD
by Riordon & Riordon
Attorneys

Oct. 27, 1931.  C. F. GODDARD  1,829,591
ROAD FILE
Filed March 25, 1930    3 Sheets-Sheet 2

Inventor
CHARLES F. GODDARD.
By Pinder & Pinder
Attorneys

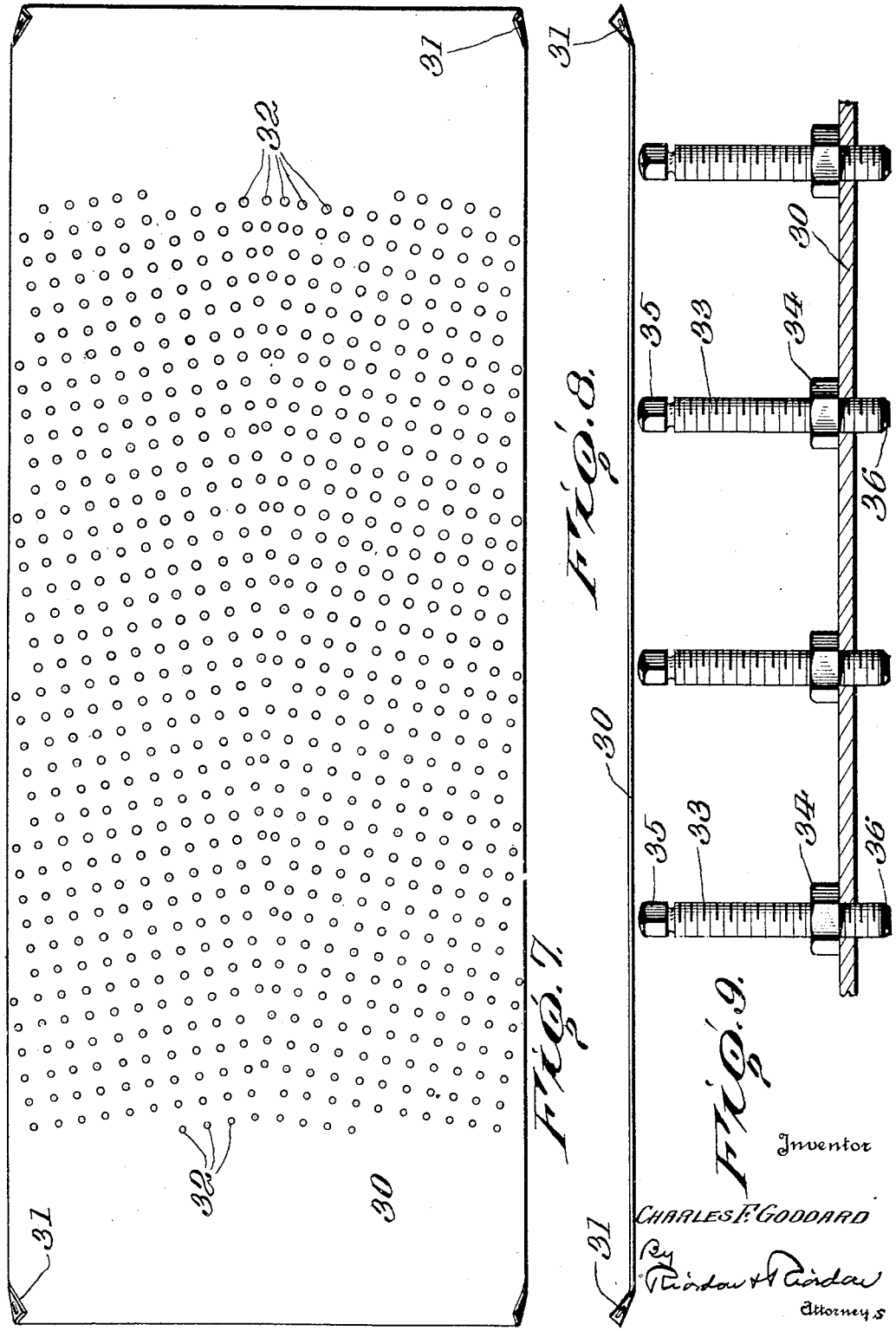

Patented Oct. 27, 1931

1,829,591

UNITED STATES PATENT OFFICE

CHARLES F. GODDARD, OF DENVER, COLORADO, ASSIGNOR TO THE AUTOMOBILE STORAGE ELEVATOR COMPANY, OF DENVER, COLORADO, A CORPORATION OF COLORADO

ROAD FILE

Application filed March 25, 1930. Serial No. 438,792.

The present invention relates to road tools of the type designed to remove "washboard" corrugations from gravel and dirt roads, and to this end, there is provided a drag having a series of adjustable teeth projecting therefrom toward the road surface, the tool utilizing, however, the principle of a file or rasp for road work, by covering the entire surface worked, with the teeth points.

The object of the tool is to "file down" the corrugations and generally smooth or level the surface by taking a very large number of narrow cuts instead of one wide cut as distinguished from a scraper and as distinguished from a harrow which would dig up the surface.

It is also desirable, in view of the fact that most dirt roads are crowned for drainage purposes, to provide a tool which will conform generally to the larger inequalities of the road surface, and also to limit the depth that the teeth of the tool may cut at a single pass, while retaining and distributing the chips or filings over the surface worked, thereby to fill up or equalize the hollows while filing down the corrugations.

Accordingly the teeth of the device are mounted in a backing member which is to a large degree flexible, and preferably of open or mesh-like construction. This backing member may be closed, if desired, but the preferred form will be one in which openings are provided, giving the member a foraminous appearance. The teeth themselves are adjustable, in order that the depth of cut may be predetermined and in order that the teeth may be reset as they wear down.

To the attainment of the foregoing and other objects which may hereinafter appear, reference is made to the attached figures of drawings in which like reference numerals designate like parts.

In the drawings:

Fig. 7 illustrates a plan of still another modification.

Fig. 8 represents an elevation of Fig. 7, and

Fig. 9 is an enlarged detail sectional view of the device in Fig. 7.

Referring more specifically to the drawings, it will be observed that in Figs. 1 to 4 a backing member designated generally at 10 is formed by criss crossing a series of strips 11 and 12, lattice fashion, these strips having threaded perforations 13 at intersecting points.

Figure 4:
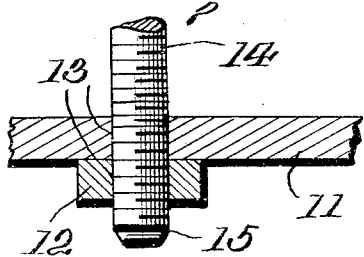
Fig. 4 is a detailed sectional view showing the mounting of a tooth.

Mounted in the perforations are threaded pins 14 which have the dual function of holding the criss-cross strips together and providing road engaging teeth for the device. As shown in Fig. 4 these pins project a short distance below the lower face of the backing member and the ends 15 thereof form teeth which, as hereinafter explained, will file down the surface over which the device is dragged.

The strips 11 and 12 are desirably formed of reasonably light gauge material such as strap metal and thus are provided with an inherent flexibility. The bolts 14 are in the nature of set screws, being merely threaded pins and not square or round pins with threaded ends. Being screw threaded directly into the backing member, they may be repeatedly screwed down until the entire tooth formed by each bolt is worn out. With the use of these pins and the means of adjustment, it is permissible to use strips of metal in the backing member so thin as to be pliable by the inherent flexibility of the metal. Preferably, the pins will each be provided with a head 16 whereby a wrench may be utilized for adjustment purposes.

Figure 1:
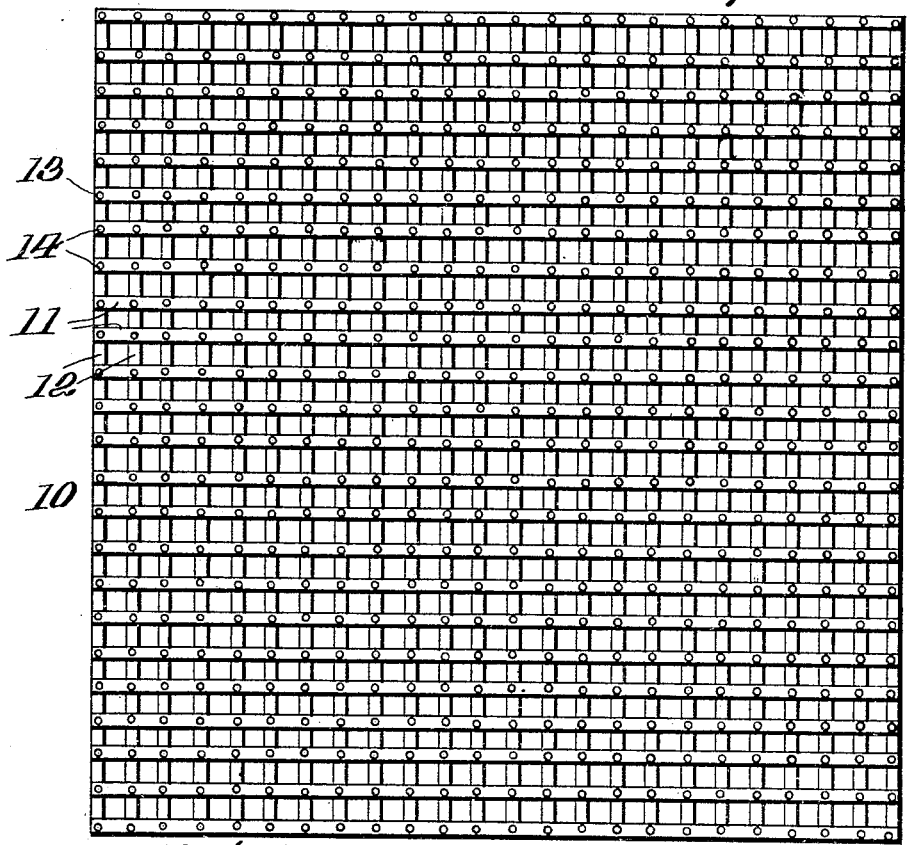
Fig. 1 represents a plan of one form of invention.
Figure 2:
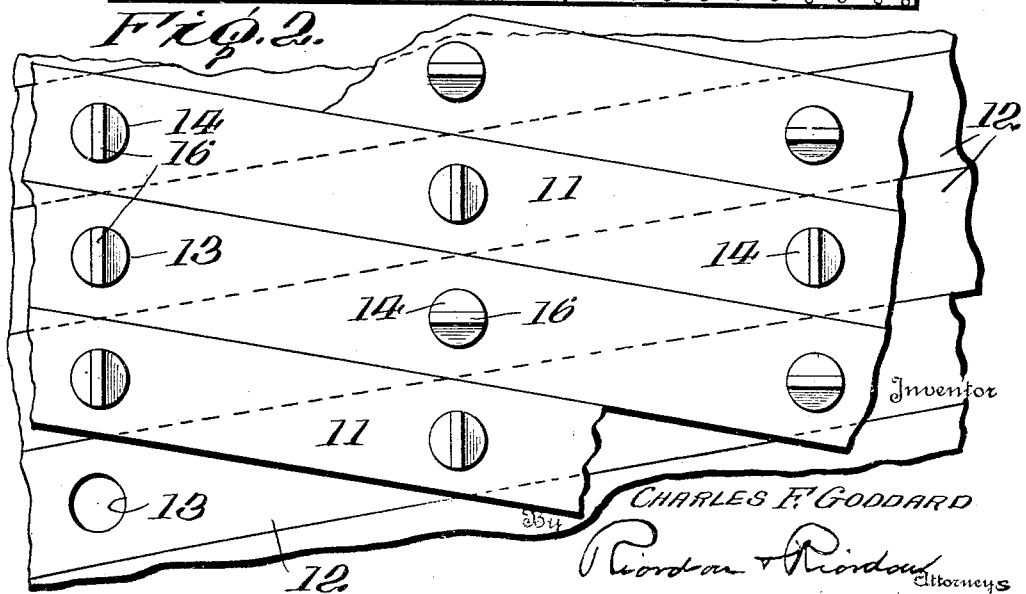
Fig. 2 is a fragmentary detail plan of the form shown in Fig. 1, but in a collapsed position.

In assembling the device, the strips will be placed together in collapsed fashion as indicated in Fig. 2 and the pins positioned until a desired projection below the lower strap 12 is reached. Then by the application of tension to the opposite corners closest to each other the collapsed device may be opened to the operative position shown in Fig. 1. This opening of the lattice work will have the effect of turning the straps 11 and 12 about the pin 14 in opposite directions towards each other and as the leverage is extremely great the pin will immediately be locked in position even more effectively than if a lock or binding nut is used. Furthermore, this locking action will take place simultaneously with respect to each and every bolt or pin in the device.

When it is desired to adjust the pins to take up wear, application of tension to the two corners which were not used in opening the backing member will tend to collapse the device, thus removing the binding action on all of the bolts at the same time. An easy way of opening or collapsing the device will be to hook one corner of the framework to a convenient telegraph pole and a truck to the opposite corner and tension applied in this manner.

In use this form of device will be dragged or towed at an angle by the provision of draft lines or tow ropes 17, one of which is longer than the other, and by following a line of draft angularly disposed to the sides of the tool, as illustrated by the arrow D in Fig. 1, a staggered arrangement of the teeth will be presented to the road surface in such a manner that no two successive teeth will follow in line, thus the entire surface of the road will be combed or filed.

Normally the backing member will be held in its open or operable position, solely by the binding effect between the strips and the pins, but if desired, bracing means may be used to prevent collapse of the member during use.

Figure 5:
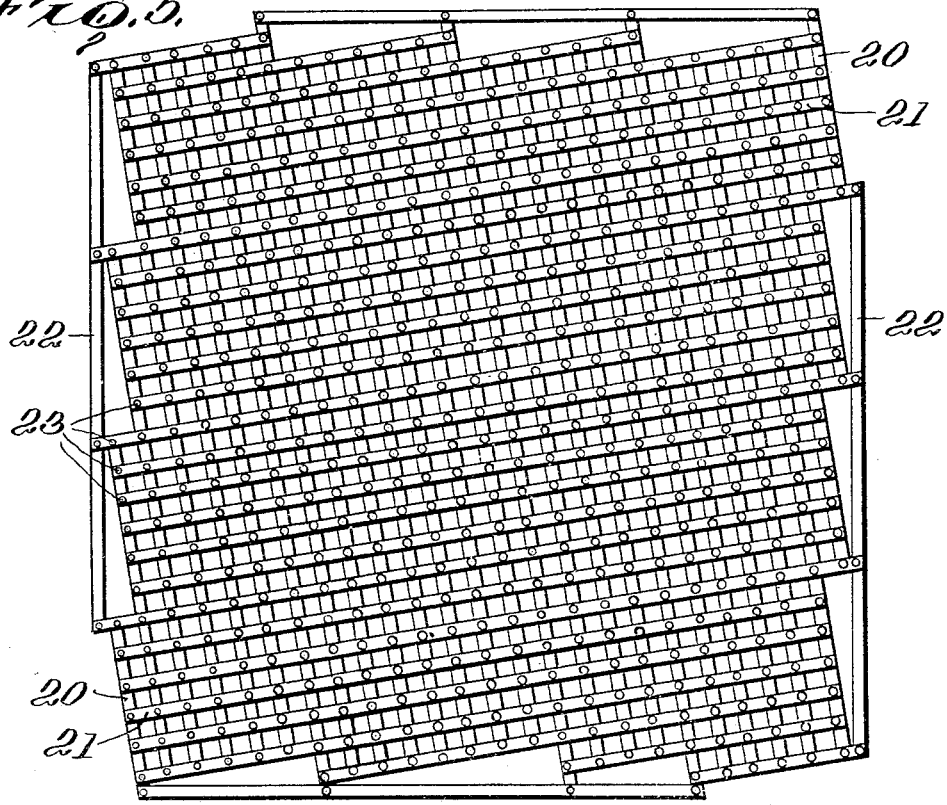
Fig. 5 is a plan of a modified form of the invention.
Figure 3:
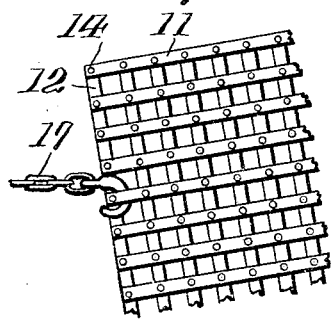
Fig. 3 is a fragmentary detail of Fig. 1 showing a draft hook connected thereto.
Figure 6:
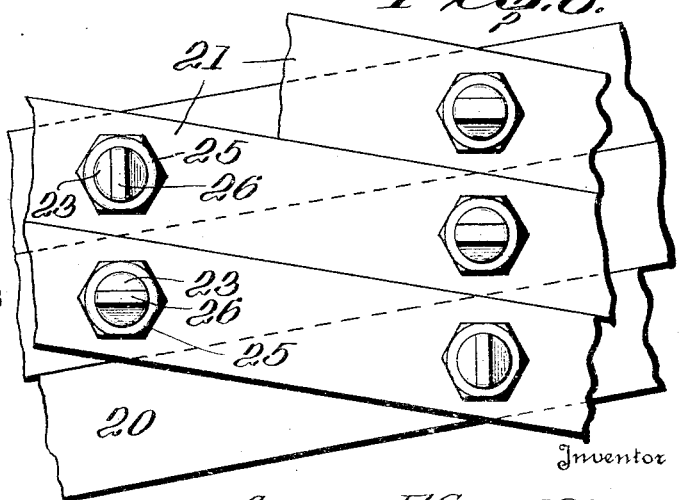
Fig. 6 is a view similar to Fig. 2 but showing the device of Fig. 5 in a collapsed position.

In Figs. 5 and 6, a modified form of the tool is illustrated. In this form a series of strips 20 and 21 are crossed lattice fashion with threaded perforations at intersecting points. Bracing strips 22 are mounted about the periphery of the backing member formed by the criss-crossing strips 20 and 21 and these members serve to prevent a folding up or collapsing of the backing member. Teeth are provided in the form of pins 23 similar to the pins 14 of the other form and are screw threaded into the perforations to serve not only as teeth but also to hold the strips together. Lock nuts 25 may be provided if desired to prevent accidental displacement of the teeth and suitably wrench engaging heads 26 may also be provided for adjustment purposes. In this form of the device it should be noted that the line of draft will be parallel to the side strips of the tool, the teeth being arranged in a staggered relation relative to each other and disposed in angular lines relative to the sides of the tool whereby no two adjacent pins will follow in line, and the arrangement of the pins will fully cover the path worked.

When it is desired to fold up or collapse the backing member, it is merely necessary to disengage the bars 22 from the strips 20 or 21 to which they are connected, whereupon the backing members may be collapsed, as shown in Fig. 6.

In Figs. 7, 8 and 9, still a different modification is disclosed, this form consisting of a backing member 30 of reasonably light gauge sheet material, which sheet is to a large extent inherently flexible. The corners of the sheet are upturned and perforated as indicated at 31 to provide means for attaching draft lines whereby the device may be pulled along the road.

This sheet 30 is perforated through the major portion of its area, as indicated at 32, and each perforation is screw threaded for the reception of a threaded bolt or set screw 33. Lock nuts 34 are threaded on the bolts or screws 33, and in engagement with the backing member 30 to retain such bolts against accidental displacement. These bolts 33 are, similarly to the bolts 14, merely threaded pins, and form the teeth for the device. The pins will each be provided with a head 35 whereby a wrench may be utilized to adjust them and the lower or projecting ends 36 will form the cutting or filing points of the teeth.

It should be noted that the perforations in which the teeth are mounted are disposed in lines angularly displaced with reference to the normal line of movement of the backing member, to position the teeth in a staggered or disaligned arrangement. Thus when the device is drawn straight ahead, there will be no chance of the teeth grooving the surface as no two adjacent teeth will follow one behind the other, and the ends of the teeth will cover all surface worked, several times at a single pass.

In all forms of the invention, however, and obviously, other modifications may occur within the scope of this invention, the conformability to road surface which is so desirable in the backing member, will be present due to the inherent flexibility of the light flexible strips forming the lattice work or the light gauge sheet metal type of device.

Furthermore, in all forms of the invention not only the support for the teeth are flexible but the teeth are disposed when in use in a disaligned formation whereby no two adjacent teeth will follow each other.

This flexibility and disaligned formation of the teeth enables the device to measurably conform to the larger inequalities of the road surface, while at the same time permitting the teeth to reduce the inequalities of the road. This prevents any tendency to destruction of the intentionally "crowned" surface of the road, thus equalizing the road surface from a sea wave form. With the use of a lattice of bars as distinguished from the flat sheet a somewhat more flexible device is provided and the filings or cuttings of the road will pass through the open portions of the backing member and ride upon the solid portions until hollows are encountered, whereupon the dirt will be automatically deposited therein. The sheet form, however, will be found desirable on certain types of roads and will accomplish the desired objects by exerting a rubbing or smoothing effect as the corrugations in the road are filed down.

In other words, each form has its own advantages and one form may be more desirable under certain conditions of road bed than another.

What I claim as new and desire to secure by Letters Patent of the United States, is:—

1. A road tool comprising a frame member, said member being flexible relative to the road surface and having a plurality of road engaging projections thereon, and effective to remove road surface inequalities.

2. A road file having a backing member, said member being flexible relative to the road surface and having a plurality of rasp-like, road engaging projections on one surface thereof, effective to remove road surface inequalities.

3. A road file having a backing member, said member being flexible relative to the road surface and having a plurality of rasp-like projections on one surface thereof, effective to remove road surface inequalities, said projections being disposed in groups and said groups being disposed angularly with respect to the line of draft when said member is in use.

4. A road file having a backing member, said member being flexible relative to the road surface and having a plurality of adjustably mounted teeth therein, effective to remove road surface inequalities.

5. A road file comprising a unitary backing member conformable to the crown of the road and having teeth projecting from said member effective to file down corrugations in the road surface.

6. A road file having a backing member, said member being flexible relative to the road surface and having a plurality of adjustably mounted teeth therein, effective to remove road surface inequalities, said projections being disposed in groups and said groups being disposed angularly with respect to the line of travel of said member.

7. A road file consisting of a unitary backing member and teeth mounted therein, said member comprising a series of criss-crossed flexible metal strips having threaded perforations at their intersecting points and said teeth consisting of threaded pins mounted in said perforations thereby to connect said strips.

8. A road file comprising a unitary backing member conformable to the crown of the road and having teeth projecting from said member effective to file down corrugations in the road surface, and means to predetermine the cut, by the length of the teeth.

9. A road file comprising a unitary backing member conformable to the crown of the road and having teeth projecting from said member effective to file down corrugations in the road surface, means to predetermine the cutting depth of the teeth, said member being constructed and arranged to retain and distribute the chips or filings uniformly over the worked surface, and into any hollows thereof.

10. A road file comprising a unitary backing member conformable to the crown of the road and having teeth projecting from said member effective to file down corrugations in the road surface, means to predetermine the cutting depth of the teeth, said member being constructed and arranged to retain and distribute the chips or filings uniformly over the worked surface, and means to adjust the teeth.

11. A road tool comprising a foraminous backing member formed of a lattice of cross strips having threaded pins at each intersection of the strips, said pins having projecting ends on the under surface of the lattice to provide teeth and projecting ends on the upper surface of the lattice to provide means for adjusting the teeth and said device being adapted for towage by draft lines of unequal length, whereby when in use, the teeth will be disaligned with each other and in rows angularly disposed to the sides of the road.

12. A road file consisting of a backing member and teeth mounted therein, said member comprising a series of criss-crossed flexible metal strips having threaded perforations at their intersecting points and bracing strips substantially encompassing the area of said member and having perforations therein to permit attachment to the criss-crossed strips.

13. A road file consisting of a collapsible backing member having teeth mounted therein, said backing member comprising a series of criss-crossed flexible metal strips perforated at their intersecting points and said teeth consisting of threaded pins mounted in said perforations thereby to connect said strips, and means to prevent collapsing of the backing member when in use.

14. A road file having a closed backing member, said member being flexible relative to the road surface and having a plurality of rasp-like projections on one surface thereof, effective to remove road surface inequalities.

15. A road file having a closed backing member, said member being flexible relative to the road surface and having a plurality of adjustable teeth projecting therethrough and effective to remove road surface inequalities.

16. A road file consisting of a flexible, closed backing member, formed of a metal sheet and having threaded perforations therein for the mounting of a plurality of teeth.

17. A road file consisting of a flexible, closed backing member formed of a metal sheet and having threaded perforations therein for the mounting of a plurality of teeth, said perforations being disposed in groups and said groups being angularly disposed with respect to the center line of the sheet.

18. A road file consisting of a flexible, closed backing member formed of a metal sheet and having perforations therein, and a plurality of teeth adjustably threaded in the perforations, said teeth being threaded pins.

19. A road file consisting of a flexible, closed backing member formed of a metal sheet and having perforations disposed in groups and said groups being angularly disposed with respect to the center line of the sheet, and a plurality of teeth adjustably threaded in the perforations, said teeth being formed from threaded pins.

20. In a device for removing corrugations from gravel and dirt roads, a backing member, said member being flexible with respect to the road surface, means therein to partially file down the corrugations, said member being constructed and arranged therein to partially fill up the hollows between said corrugations.

In testimony whereof, I hereunto set my hand.

CHARLES F. GODDARD.